C. W. PARKER.
LUBRICATOR FOR VEHICLE BRAKES.
APPLICATION FILED SEPT. 30, 1920.

1,380,584.

Patented June 7, 1921.

Inventor
Clark W. Parker.
By Edward N. Pagelsen
Attorneys

UNITED STATES PATENT OFFICE.

CLARK W. PARKER, OF NEW YORK, N. Y.

LUBRICATOR FOR VEHICLE-BRAKES.

1,380,584.  Specification of Letters Patent.  Patented June 7, 1921.

Application filed September 30, 1920. Serial No. 413,862.

*To all whom it may concern:*

Be it known that I, CLARK W. PARKER, a citizen of the United States, and residing at New York, in the county of New York and State of New York, have invented a new and Improved Lubricator for Vehicle-Brakes, of which the following is a specification.

This invention relates to means for supplying lubricating oil to vehicle brakes of the general character set forth in my prior Patent No. 1,315,236, dated September 9, 1919, and its object is to provide oil conductors which will insure a free circulation of lubricating oil throughout the brake mechanism.

This invention consists in the details of construction illustrated in the accompanying drawing and particularly pointed out in the claims.

Figure 1:
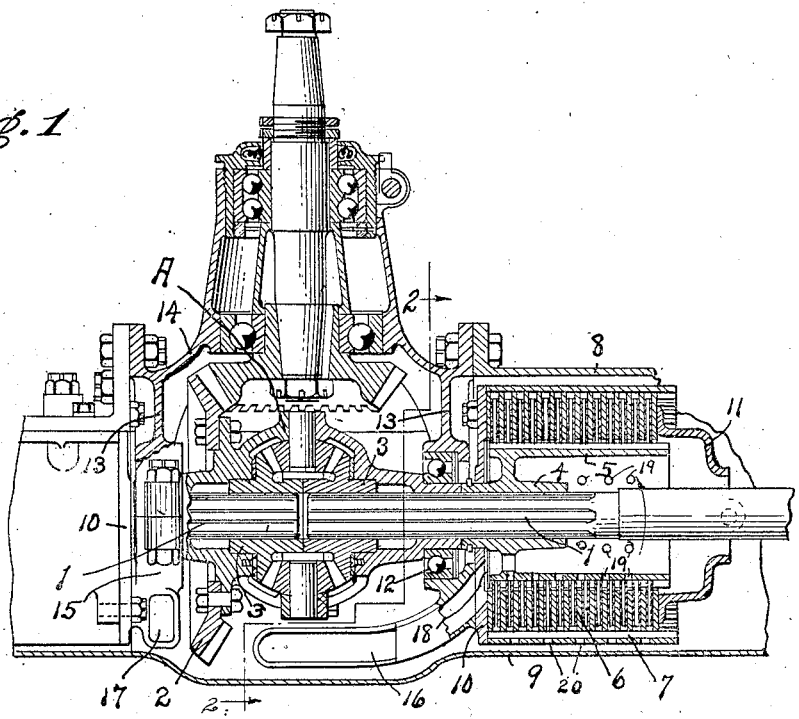
Figure 2:
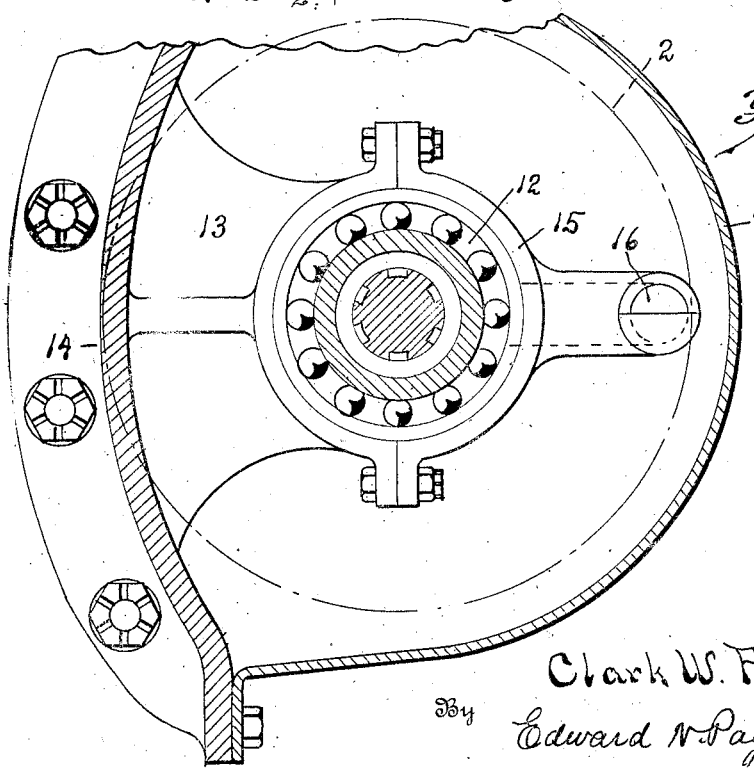

In the drawing, Figure 1 is a horizontal section of a part of a rear axle construction showing my improved lubricating device. Fig. 2 is a section on the line 2—2 of Fig. 1.

Similar reference characters refer to like parts throughout the several views.

The drawing shows a pair of alined driving shafts or axles 1 of a motor vehicle connected by a differential A which embodies a main ring gear 2. On each shaft is the hub 4 of a drum 5 having longitudinal external teeth on which drum the brake disks 6 of any desired character are mounted. One half of these disks have internal teeth engaging the teeth of the drum 5 while the others have external teeth engaging the internal teeth of the shell 7 connected to the part 8 of the front plate of the casing 9. A plate 10 at the inner end of each shell 6 receives the thrust the brake disks receive from the thrust collar 11.

The differential is mounted in the bearings 12 on the brackets 13 extending from the middle part 14 of the front plate of the casing. The caps 15 of these bearings support the oil conductors 16 and 17, one on each side of the main gear 2 of the differential. These conductors are so positioned that their inlets are adjacent the gear 2 at about the plane passing horizontally through the shafts 1, as indicated in Fig. 2.

The disks 6 may be constructed in the manner shown in my prior Patent No. 1,315,236, dated September 9, 1919, or in my pending application Serial Number 400,700, dated August 2, 1920, in both of which cases a free flow of the lubricating oil or other liquid is provided for.

The inner ends of the shafts 1 are slidably splined in the bevel gears 3 of the differential and in the hubs 4 of the drums 5 of the brake mechanisms so that these drums will turn with the main gear 2. As this large gear rotates it carries up with it the lubricant in the casing 9, and as this lubricant falls back, a large part of it enters the adjacent conductors 16 and 17 and passes through the openings 18 in the inner end plates 10 of the shells 7 of the brake mechanisms. The drum 5 is formed with holes 19 through which the oil may freely pass to the disks 6, lubricating and cooling them. The lubricating oil may pass through the holes 20 in the shells 7 from these disks to the outer casing 9 and flow to the central part thereof. This continuous flow of lubricant prevents heating of the brake disks even under most trying conditions and substantially prevents wear.

It will be understood that instead of lubricating oil, any other desired liquid may be employed, but in each case the liquid is preferably one which takes up the heat generated by the friction disks and thus cools them, which is made possible by the capacity of the mechanism for circulating large amounts of this cooling liquid.

The details and proportions of the lubricating devices for the brake mechanism may all be changed by those skilled in the art to adapt them to the different styles of vehicle axles without departing from the spirit of my invention as set forth in the following claims.

I claim:—

1. A lubricating mechanism for disk-brake mechanisms of alined shafts which are connected and actuated by differential gearing, consisting of an oil conductor for each brake mechanism extending toward the main ring gear of the differential and having its inlet at substantially the level of the central line of the shafts.

2. In combination, a pair of alined shafts, a casing therefor and a cover for the casing, a differential gearing mounted on said cover and connecting the adjacent ends of the shafts and embodying a main gear ring, a disk-brake mechanism for each shaft mounted on said cover, and an oil conductor for each brake mechanism extending toward said main driving gear to receive lubricating oil carried up by said gear.

3. In combination, a pair of alined shafts, a casing therefor serving as a lubricant reservoir and a cover for the casing, a differential gearing within the casing and connecting the adjacent ends of said shafts, brackets extending from said cover supporting gearings for said differential gearing adjacent the brake mechanisms, and caps for said bearings embodying oil conveyers extending toward said differential gearing to receive a part of the lubricant lifted by the differential gearing.

4. A driving mechanism for motor vehicles comprising alined shafts and differential gearing connecting adjacent ends thereof, a casing comprising an oil receptacle and a cover therefor, said casing inclosing the differential gearing and adjacent ends of the shafts, a disk-brake mechanism mounted on each shaft and having a plate on the end toward the differential to resist inward movement of the brake disks, said plate having a hole to receive lubricant, and an oil conductor extending from said hole to the portion of said differential having the greatest diameter.

5. A lubricating device for brake disks mounted on the alined driving shafts of motor vehicles connected by a differential mechanism, comprising a lubricant receptacle inclosing the shafts and differential, and conductors extending toward each other from the adjacent brake mechanisms to receive lubricating oil carried up by the differential mechanism.

CLARK W. PARKER.